Jan. 23, 1968    R. A. HITCH ETAL    3,365,229
CONTAINER COUPLING MEANS
Filed Dec. 30, 1965    2 Sheets-Sheet 1
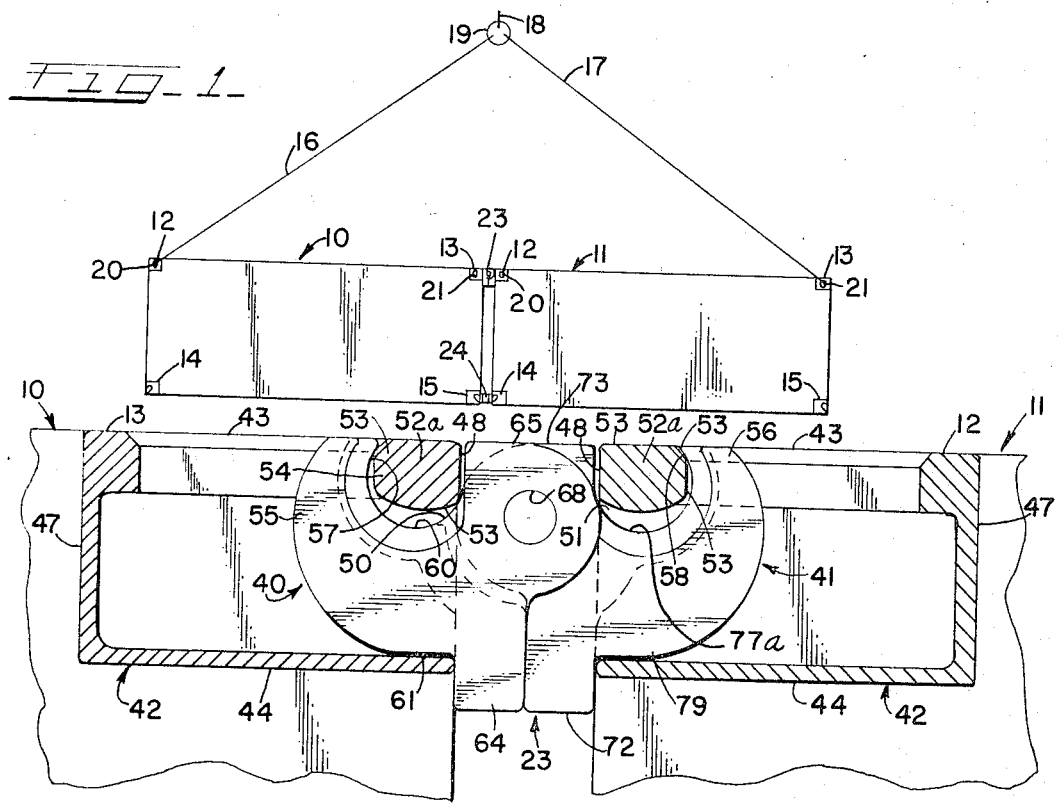
INVENTORS
ROBERT A. HITCH
JOHN J. MARTIN
BY Richard J. Myers
ATT'Y.

Jan. 23, 1968   R. A. HITCH ETAL   3,365,229
CONTAINER COUPLING MEANS
Filed Dec. 30, 1965   2 Sheets-Sheet 2
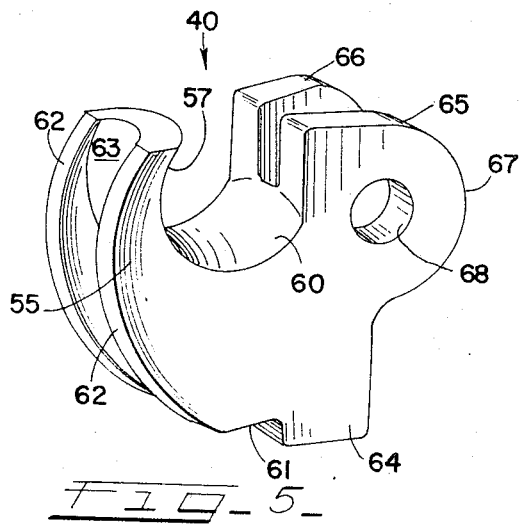
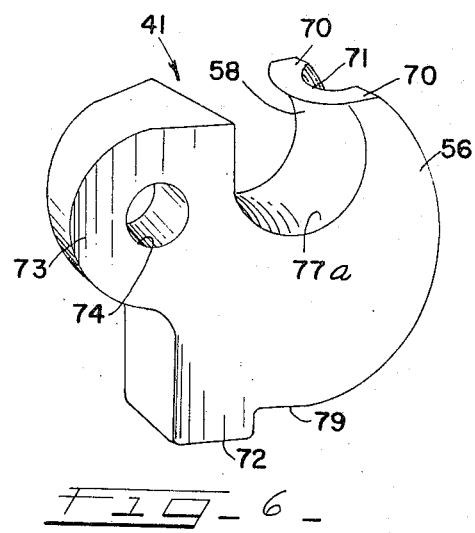
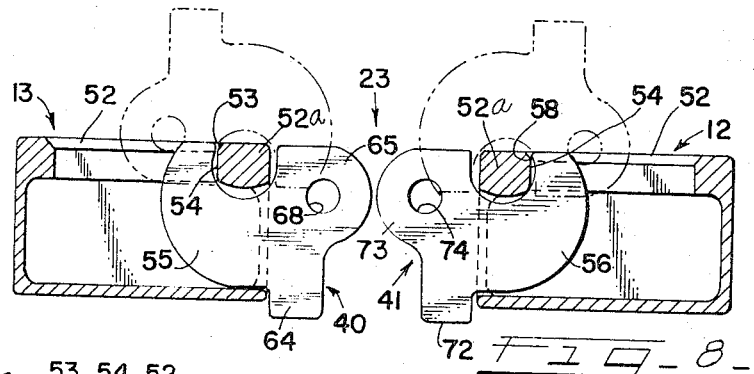
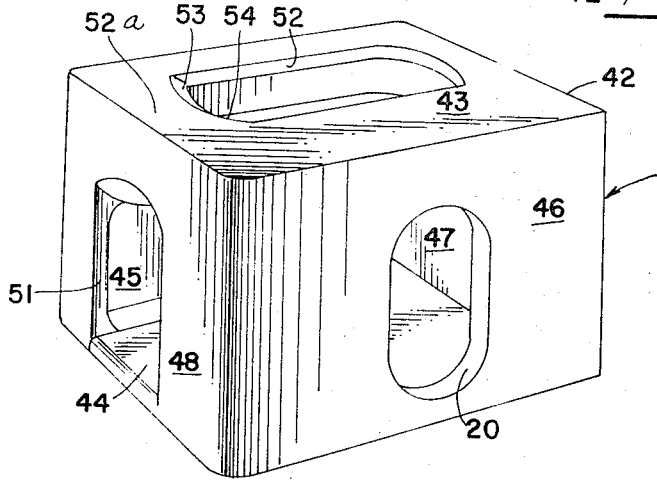
INVENTORS
ROBERT A. HITCH
JOHN J. MARTIN
BY Richard J. Myers
ATT'Y.

United States Patent Office 3,365,229
Patented Jan. 23, 1968

3,365,229
CONTAINER COUPLING MEANS
Robert A. Hitch, Milford, N.J., and John J. Martin, Weatherly, Pa., assignors to Pullman Incorporated, Chicago, Ill., a corporation of Delaware
Filed Dec. 30, 1965, Ser. No. 517,626
10 Claims. (Cl. 294—67)

ABSTRACT OF THE DISCLOSURE

A top coupler means for interlocking a pair of opposed container corner brackets to provide for a tandem coupling of said containers, said top coupling means including a pair of first and second severable top coupler elements, each element having a clamp portion for engagement with a respective corner bracket and a spacer portion engageable with the spacer portion of the other coupler element attendant to space separation of one corner bracket from the other, said first top coupler element being provided with one coupler element interlock portion and said second top coupler element being provided with another coupler interlock portion for intercoupling with the one interlock portion, and means for pivotally interlocking one element with the other, and bottom coupling means for coupling the bottoms of the containers together, and hoisting means therefor.

---

This invention relates to coupling means for containers and in particular relates to coupling means for hoisting containers in order to transfer same between land, air, and marine vehicles.

Containerization is the modern avenue for carrying various types of goods or lading by various means of transportation, such as by ship, airplane, railroad car and by truck trailer over the highways. Business is endeavoring to standardize the type of containers employed in each mode of transportation. The cargo bodies or containers, to meet the requirements of this universal interchange of transportation, are of standardized dimensions, generally about 8 feet by 8 feet by 20 feet, which renders the over-road operation of a single cargo body somewhat uneconomical. Accordingly, it is common practice to employ a pair of semi-trailers, each containing a detachable container body thereon, connected in tandem so as to render the over-road operation more economical. This also makes it more economical when hoisting containers from one mode of transportation to another. It is the arrangement for coupling in tandem containers of the general type with which the present invention is primarily concerned.

It is therefore a principal object of the present invention to provide a new and improved coupling arrangement for connecting containers in order to transfer them from one type of transportation to another.

It is a further object to provide a coupling arrangement for connecting in tandem container or cargo bodies of the general type above described, wherein the coupling occurs at the corner brackets of the container.

It is still another object to provide a coupling arrangement for tandem connection between two containers or cargo bodies having a pivotal coupling arrangement at the lower corner brackets, wherein there is provided a removably mounted coupling means for the top corner brackets in order to lift two containers at once by hoisting means attached at the outer end of each container top corner bracket.

It is still another object to provide a hoisting coupling arrangement which is economical and of simple construction so as to facilitate the removal of the container from one form of transportation to another.

It is another object of the present invention to provide for a hoisting dual coupling arrangement between a pair of containers wherein the lower coupling is pivotally attached to the lower inboard corner bracket and the upper coupling is removably and pivotally attached to the upper inboard corner bracket of each respective container and whereby the outboard portions of each container are provided with brackets for the attachment of hoisting means such as a line for lifting both containers from one transportation vehicle to another.

These and other objects will become more apparent from reference to the following description, claims, and appended drawings wherein:

FIG. 1 schematically illustrates the hoisting arrangement for a pair of containers in coupled tandem relation;

FIG. 2 is an elevational partial view of a pair of containers employing the novel top coupling arrangement of the invention;

FIG. 3 is a plan view of the top coupling arrangement shown in FIG. 2;

FIG. 4 is a side elevational view of the bottom coupling arrangement used in over the road transportation;

FIG. 5 is a perspective view of the top coupler for the rear top corner bracket;

FIG. 6 is a perspective view of the top coupler for the front top corner bracket;

FIG. 7 is a perspective view of the front or rear top corner bracket; and

FIG. 8 is a diagrammatic view showing the positioning of the top couplers in the top corner brackets of the container pursuant to hoisting of the containers from one means of transportation to another.

With reference now to the drawings, and in particular to FIG. 1, there is shown a pair of forward and rearward containers or cargo bodies 10 and 11 respectively, each of which is of identical construction to the other. Each container 10 or 11 is provided with a pair of forward top corner brackets 12, one of which cannot be seen, and a pair of rear corner brackets 13, one of which cannot be seen. These top corner brackets are spaced at the top lateral corners of a respective container. Each container 10 or 11 is also provided with a forward bottom pair of laterally spaced corner brackets 14 and also with a pair of laterally spaced rearward bottom corner brackets 15. All of the top corner brackets, front and rear, are of identical construction except that the front corner bracket is a mirror image of the rear top corner bracket of each container. However, the bottom front corner bracket differs from the rear corner bracket as will be discussed below. For hoisting operation in transferring the containers 10 and 11 from one type of transportation to the other, such as railroad, truck trailer, ship or airplane, a hoisting mechanism is employed, part of which is shown by hoist lines 16 and 17 and 18 (partly shown), all coupled to line tie member 19, the line 18 going to a hoisting mechanism or rig on a vehicle such as a ship, plane or land vehicle. The lower ends of the lines 16 and 17 are connected to eyes 20 and 21 respectively, and the top front and rear corner brackets 12 and 13 respectively of the outboard sides of the containers 10 and 11. Removable top coupler means 23 couple together the inner front and rear top corner brackets of the containers 10 and 11 and lower or bottom coupler means 24 couple together the inner front and rear brackets 14 and 15 of the containers 11 and 10 respectively. It is seen that by this hoisting arrangement the lines 16 and 17 form a triangle with the top surfaces of the containers 10 and 11 and in the hoisting operation the top and bottom couplers 23 and 24 maintain the containers 10 and 11 in longitudinally extended coupling relation while lifting these containers and transferring them to another form of transportation.

There are types of bottom coupler means 24 providing for pivotal movement between the forward and aft container bodies 10 and 11 when mounted in tandem relation upon a pair of trailer chassis which may be utilized, but for purposes of description thereof reference is made to the type of bottom coupling means as employed and disclosed in co-pending U.S. patent application, Serial No. 452,563, filed May 3, 1965, now U.S. Patent No. 3,294,420, to John J. Martin and entitled "Coupling Arrangement for Tandem Axle Semi-Trailers." For an operation of such a bottom coupling arrangement reference may be made to said co-pending application and description is given here briefly in FIG. 4 for correlating its function in relation to the top coupler means 23 and the hoisting structure for transferring the containers 10 and 11 from one means of transportation to another. With reference to FIG. 4 it is seen that the coupling means 24 is provided with a plurality of removable coupling elements pivotally interlocking containers 10 and 11 at their respective lower corner brackets 15 and 14. Lower corner bracket 14 is generally rectangular in shape and is provided with a hollow cavity 29a having a laterally extending clamp lug of circular cross section 28 and a journal 29 for supporting elongated tie member 30, which is removable and has a head 31 extending into the cavity 32 of corner bracket 15 and over clamping bar 33 lateral of bracket 15. Hollow slidable sleeve members 33a and 34 are disposed about tie member 30 and engage respective end surfaces of corner brackets 15 and 14 and are so held by U-shaped locking block 35, the slide member or keeper 33a engaging with the projection 36 of the tie member 30 keeping the entire removing couple assembly 24 in locked engagement with the respective corner brackets 15 and 14. Sliding member or keeper 34 is provided with a cavity filling lug 38 and sliding member or keeper 33a is provided with a cavity filling lug 39, each of the lugs 38 and 39 extending into the respective cavities 32 and 29a of the brackets 15 and 14. The arcuate surface 32a of the clamping bar 33 and the arcuate surface 31a of head 31 in conjunction with the tapered surface 39a of the projection 39 allows for pivotal movement of the tie member 30 and its connection between the brackets 15 and 14, so that when the containers 10 and 11 are mounted on the respective chassis of a semi-trailer, each container in its respective chassis which holds the container has relative pivotal movement with respect to one another when the semi-trailer unit is pulled over the highway as shown by said above referred to copending application.

The novel detachably or removably mounted top coupler means 23 couples the rear inward or inboard corner bracket 13 of the forward container 10 with the forward inward or inboard corner bracket 12 of the rear container 11 and comprises a pair of pivotally mounted coupler elements 40 and 41, as shown in FIGS. 2, 3, 5, 6, and 8. The construction of the front or rear top corner bracket 12 or 13, as previously stated, is similar except that one is a mirror image of the other and comprises a rectangularly shaped box member 42 having top, bottom and side walls, and rear and front walls 43, 44, 45, 46, 47 and 48, the respective outer side walls 46 each containing a respective elongated oval like eye or aperture 20 or 21 for receiving a hoisting line 16 and 17 as above described, said couplers 40 and 41 being extendible through elongated apertures 50 and 51 in the outer transverse walls 48 of the respective brackets 12 and 13, and the top walls 43, 43 each have a beveled aperture portion defining elongated oval like apertures or bores 52, 52 for receiving upper portions of a respective coupler element 40 or 41. The outer transverse portion of each of the top walls 43 define a transversely extending bar or outer wall section 52a which in cross section, as shown in FIG. 2, is provided with rounded corners 53 and has inner wall surface 54 defining in part the aperture 52 and receives the clamping portions 55 of member 40 and 56 of member 41, the inner rounded or curved surfaces 57 and 58 of the members 40 and 41 engaging the rounded corners 53 of each of the tie bars 52a of the corner brackets 12 and 13. The clamping part 55 of the couple element 40 is C-shaped in elevation as shown in FIG. 2 and in addition to having an arcuate surface 57 to define the aperture 60 has a lower flat outer surface portion 61 that rests on the lower wall 44 of the corner bracket 13. The C-shaped clamp part 55 comprises a pair of projections or flange sections 62 and a central recessed or scalloped out portion 63, these portions 62, 62 and 63 extending around and intersecting with a depending arm or abutment spacer portion 64 that extends the lateral width of the coupler element 40. The coupler element 40 comprises a third interlock section of clevis part 65 that is integral with the C-shaped clamp part 55 and the abutment portion 64 and comprises a pair of trunnion or ear sections 66 and 67 that diverge outwardly of the clamp section 55 and are spaced apart from one another, as seen in FIG. 2. Each trunnion or ear 66 or 67 in elevation, as shown in FIG. 1, is provided with a pin receiving aperture 68 aligned with the other trunnion 66. The other coupling element 41 is similarly constructed to the element 40 and is provided with the clamp section 56 having a pair of curved or arcuate ear sections 70 spaced apart by a connecting hollowed-out section of rim 71, the clamp portion 56 merging with the downwardly depending abutment 72. However, instead of having a pair of trunnions the element 56 is provided with an interlock in the form of a tongue 73 which in plan view as seen in FIG. 3 converges as it extends outwardly from the clamp portion 56 and is provided with an aperture 74 in elevation as seen in FIG. 2, the aperture 74 being alignable with the apertures 68, 68 of the trunnions 66, 67 whereby pin 75 (see FIG. 2) may be inserted through the apertures of the interlock trunnions and the tongue for coupling elements 40 and 41 together. The pin 75 has a tapered shank to its head 76 for conforming to the outside surface of the trunnion 67 and at the other end is provided with a hole 77 for receiving a cotter pin 77a or the like outwardly of the other trunnion member 66. It will be noted that the outer face portions of trunnions 66 and 67 and the tongue 73 are arcuately shaped and that the coupling element 41 is provided with the curved arcuate surface 77a, the upper end 58 of which engages the element 52a in a manner similar to clamp portion 55 engaging the other member 52a. The clamp portion 56 at its lower surface 79 engages wall 44 right of its bracket in a manner that clamp 55 has its surface 61 engaging the wall 44 of its bracket. The outer curved portions 80 and 81 of the clamp 56 and 55 as seen in elevation in FIG. 3 overlap the member 52a of each bracket 12 and 13.

The lower coupler arrangement in over the road operation pivotally connects the inboard corner brackets 13 and 12 of the containers 10 and 11, but when it is desired to couple the containers together for hoisting operations, the sleeve 35 of the lower coupler element 24 is removed and clamping member 31 is removed, whereby the containers are separated a sufficient distance to allow insertion of the top coupler elements 40 and 41 as seen in FIG. 8. Each coupler element 40 and 41 is placed in an inverted position over the respective tie rods 52a, 52a of the respective brackets 13 and 12, as seen in FIG. 8 in dotted line. Each coupler element is then pivoted so that its respective member 52 is brought to the solid line position shown in FIG. 8. Next the lower coupler parts 31 and 35 of the coupler means 24 are re-positioned as shown in FIG. 4. Then the two containers which have been previously longitudinally and laterally aligned are brought together to align the apertures 68, 68 of trunnions 66 and 67 with the aperture 74 of the tongue 73. The pin 76 is inserted through the openings 68, 74 and 68 and then cotter pin 77a is inserted in opening 77 and the hoisting lines 16 and 17 are tied to the front and rearmost eyes 20 and 21 of the brackets 12 and 13 to allow hoisting of the two containers in tandem from the trailer to a railroad car or to a ship or to an airplane. It will be appreciated that the same procedure is followed when transferring the tandem containers from the ship or plane to a trailer or a railroad car.

It is thus seen that the coupler elements 40 and 41 provide a clamping structure 55 and 56 in conjunction with a trunnion and tongue structure and abutments or spacers 64 and 72 that readily lend themselves to adapt to the corner bracket construction of the containers, this top coupler arrangement cooperating with the bottom coupling arrangement to allow for the hoisting of containers in tandem secured to the hoisting lines of a hoisting mechanism. This arrangement insures that the containers will be properly transferred without any tipping or tilting of the contents within the containers to insure proper removal to a safe storage area.

The foregoing description and drawings are given merely to explain and illustrate the invention, and the invention is not to be limited thereto, except insofar as the appended claims are so limited, since those skilled in the art who have the disclosure before them will be able to make modifications and variations therein without departing from the scope of the invention.

What is claimed is:

1. A top coupler means for interconnecting a pair of container corner brackets in tandem relation for use in lading carrying vehicular transportation means comprising a first coupler element having a C-shaped clamp portion for connection with a container corner bracket and a depending spacer portion integral with the clamp portion and a clevis portion having a pair of spaced apart apertured trunnions integral with the clamp portion and the spacer portion, a second coupler element having a C-shaped clamp portion for engagement with the corner bracket of the other container and a depending spacer portion engageable with the first mentioned spacer portion to provide for sufficient spacing between the corner brackets and a tongue portion integral with the depending spacer portion and the clamp portion of the second coupler element, said tongue portion being apertured for concentric alignment with the apertured trunnions and adapted to receive therethrough and through the trunnions a locking pin means attendant to tying one bracket to the other in tandem relation.

2. A hoisting structure for transferring a pair of containers having upper and lower outboard and inboard corner brackets in tandem relation from one mode of transportation to another comprising a pair of hoisting lines adapted to couple to the outboard corner brackets of the respective containers and top coupling means adapted to couple the inboard corner brackets of the containers, and lower coupling means adapted to interlock the lower corner brackets of the inboard side of the respective containers, said top coupling means comprising a first element having a corner bracket clamp portion, a corner bracket spacing portion and a coupler interlock portion having coupler interlocking trunnions; and a second coupler element provided with a clamping portion and a depending container spacer portion and a second interlock portion, and means being provided for interconnecting the first coupler interlock with the second coupler interlock attendant to interconnecting the top and bottom inboard pair of corner brackets in tandem relation.

3. A container interlock structure for a pair of containers in tandem relation to transfer said containers from one mode of transportation to another comprising a pair of outboard and inboard corner brackets for each container, each container corner bracket having a clamp receiving bar means, a pair of lower inboard and outboard container corner brackets, the lower inboard container brackets being provided with means for pivotally connecting one lower inboard container bracket to the other, top coupling means comprising a first top coupler element having a C-shaped clamping portion engaging the clamp receiving bar means of one container corner bracket and having a depending spacer element for separating one container from the other and having an interlock trunnion portion, a second top coupler element having a C-shaped clamp portion for engaging with the clamp receiving portion of the other container and having a depending spacer portion abutable with the first named spacer portion for separating the inboard corner brackets from one another and having a tongue interlock disposable within said trunnion portion, and means for pivotally coupling the interlock trunnion portion with the tongue interlock portion, and hoisting means attachable to the fore and aft outboard corner brackets attendant to hoisting the tandem coupled containers.

4. A top coupler means and container corner bracket structure for coupling a pair of containers at their top portion and in tandem relation comprising a pair of opposed top corner brackets each having a clamp receiving cavity portion and a clamping bar at the upper outer part of said cavity, each bracket having an opening at the top thereof communicating with said cavity and defined in part by said clamping bar, said coupler means comprising first and second top coupler elements, said first top coupler element provided with a C-shaped clamp portion engaging with the clamping bar of the one corner bracket and having a depending spacer portion for separating one corner bracket from the other and having an interlock section having a pair of outwardly diverging apertured trunnions, said second top coupler element having a C-shaped clamp portion engageable with the clamping bar of the other corner bracket and having a depending spacer portion engaging with the spacer portion of the first top coupler element attendant to separating one corner bracket from the other and having an outwardly projecting interlock portion defining an outwardly tapering apertured tongue, and means being provided for coupling the apertured portions of the trunnions and tongue together in pivotal relation, each of the clamp portions of a respective coupler element being extendible within the respective cavity of a respective corner bracket, the upper ends of each C-clamp portion extending within the top wall opening of a respective corner bracket.

5. A top coupler means for interlocking a pair of opposed container corner brackets to provide for a tandem coupling of said containers, said top coupling means including a pair of first and second severable top coupler elements, each element having a clamp portion for engagement with a respective corner bracket and a spacer portion engageable with the spacer portion of the other coupler element attendant to space separation of one corner bracket from the other, said first top coupler element being provided with one coupler element interlock portion and said second top coupler element being provided with another coupler interlock portion for intercoupling with the one interlock portion, and means for pivotally interlocking one element with the other.

6. The invention according to claim 5 and said clamp portion being generally C-shaped and provided with a recess for reception of a portion of a corner bracket.

7. The invention according to claim 5 and one interlock portion having trunnions diverging outwardly of one another and the other interlock portion having a tongue tapering outwardly for reception by the said trunnions.

8. The invention according to claim 5 and said spacer portion of each coupler element being integral with and depending from the clamp and interlock portions of the respective elements and engaging one another in spacing one corner bracket from the other.

9. The invention according to claim 5 and said means for intercoupling said interlock portions of said coupling elements comprising apertured trunnion parts and an apertured tongue part receivable by said trunnion parts and pin means insertable through said trunnion parts and said tongue to form a pivotal interlock between the corner brackets.

10. The invention according to claim 5 and corner bracket means including a pair of opposed brackets, each bracket having a clamping bar for reception of a respective clamp portion of a respective element, each bracket having a cavity for insertion of said clamp portion.

References Cited

UNITED STATES PATENTS

| | | |
|---|---|---|
| 3,086,673 | 4/1963 | Tantlinger. |
| 3,092,282 | 4/1963 | Tantlinger. |
| 3,317,219 | 5/1967 | Hindin _____ 220—23.4 X |

GERALD M. FORLENZA, *Primary Examiner.*

G. F. ABRAHAM, *Assistant Examiner.*